(12) United States Patent
O'Connor et al.

(10) Patent No.: US 11,738,252 B2
(45) Date of Patent: Aug. 29, 2023

(54) METHOD AND APPARATUS FOR PRECISE DETERMINATION OF A POSITION OF A TARGET ON A SURFACE

(71) Applicant: Topcon Positioning Systems, Inc., Livermore, CA (US)

(72) Inventors: Raymond M. O'Connor, Pleasanton, CA (US); Kyle Snow, Westerville, OH (US); Xiankun Wang, Columbus, OH (US)

(73) Assignee: Topcon Positioning Systems, Inc., Livermore, CA (US)

( * ) Notice: Subject to any disclaimer, the term of this patent is extended or adjusted under 35 U.S.C. 154(b) by 176 days.

(21) Appl. No.: 17/321,540

(22) Filed: May 17, 2021

(65) Prior Publication Data

US 2021/0268359 A1    Sep. 2, 2021

Related U.S. Application Data

(62) Division of application No. 16/595,865, filed on Oct. 8, 2019, now Pat. No. 11,040,266, which is a division
(Continued)

(51) Int. Cl.
*A63B 71/06* (2006.01)
*G01C 11/06* (2006.01)
(Continued)

(52) U.S. Cl.
CPC ...... *A63B 71/0619* (2013.01); *A63B 24/0021* (2013.01); *G01C 11/06* (2013.01);
(Continued)

(58) Field of Classification Search
CPC .......... A63B 71/0619; A63B 24/0021; A63B 2024/0053; A63B 2071/0691;
(Continued)

(56) References Cited

U.S. PATENT DOCUMENTS 3,943,344 A    3/1976  Kidode et al.
3,999,853 A    12/1976 Landon
(Continued)

FOREIGN PATENT DOCUMENTS

EP    1666916 A2    6/2006
JP    H07-059894 A  3/1995
(Continued)

OTHER PUBLICATIONS

Notification of Reasons for Refusal received in Japanese Patent Application No. 2016-542754 dated Dec. 4, 2018, 6 pgs.
(Continued)

*Primary Examiner* — Jeffrey S Vanderveen
(74) *Attorney, Agent, or Firm* — Chiesa, Shahinian & Giantomasi PC

(57) ABSTRACT

A method and apparatus for determining the precise location of a target on a surface by utilizing a plurality of objects that are fixed in their position proximate to the location, thereby constituting a plurality of fixed reference points, upon which the target(s) resides or is otherwise located. The plurality of fixed references points are used either in conjunction with images of the target or certain distance measurements between the target and the fixed reference points to determine the precise location of the target(s) on the surface.

11 Claims, 6 Drawing Sheets

Related U.S. Application Data of application No. 14/581,389, filed on Dec. 23, 2014, now Pat. No. 10,478,706.

(60) Provisional application No. 61/920,910, filed on Dec. 26, 2013.

(51) Int. Cl.
*G06T 7/73* (2017.01)
*A63B 24/00* (2006.01)

(52) U.S. Cl.
CPC ........ *G06T 7/74* (2017.01); *A63B 2024/0053* (2013.01); *A63B 2071/0691* (2013.01); *A63B 2220/05* (2013.01); *A63B 2220/13* (2013.01); *A63B 2220/20* (2013.01); *A63B 2220/807* (2013.01); *A63B 2220/89* (2013.01)

(58) Field of Classification Search
CPC ............ A63B 2220/05; A63B 2220/13; A63B 2220/20; A63B 2220/807; A63B 2220/89; G01C 11/06; G06T 7/74

See application file for complete search history.

(56) References Cited

U.S. PATENT DOCUMENTS

| | | | |
|---|---|---|---|
| 4,703,444 | A | 10/1987 | Storms, Jr. et al. |
| 5,056,106 | A | 10/1991 | Wang et al. |
| 6,113,504 | A | 9/2000 | Kuesters |
| 6,149,537 | A | 11/2000 | Hooker |
| 6,431,990 | B1 | 8/2002 | Manwaring |
| 6,561,920 | B1 | 5/2003 | Hamilton |
| 7,669,338 | B2 | 3/2010 | Allen, Jr. |
| 7,684,017 | B2 | 3/2010 | Hocknell et al. |
| 8,279,417 | B2 | 10/2012 | Hocknell et al. |
| 8,638,367 | B1 | 1/2014 | Allen |
| 2002/0155417 | A1 | 10/2002 | Browne et al. |
| 2004/0147329 | A1* | 7/2004 | Meadows ................ G01S 19/19 473/131 |
| 2004/0150816 | A1 | 8/2004 | Wakashiro et al. |
| 2004/0233461 | A1* | 11/2004 | Armstrong ................ G01S 5/16 356/620 |
| 2008/0192053 | A1 | 8/2008 | Howell et al. |
| 2008/0207357 | A1 | 8/2008 | Savarese et al. |
| 2010/0179005 | A1 | 7/2010 | Meadows et al. |
| 2010/0182400 | A1 | 7/2010 | Nelson et al. |
| 2011/0122257 | A1* | 5/2011 | Kirk .......................... G01S 5/16 348/E17.002 |
| 2013/0178311 | A1 | 7/2013 | Peterson |
| 2014/0138416 | A1 | 5/2014 | Tron |

FOREIGN PATENT DOCUMENTS

| | | |
|---|---|---|
| JP | 2000-105120 A | 4/2000 |
| WO | 02/28093 A1 | 4/2002 |

OTHER PUBLICATIONS

Alessandrini, Stephen M., "A Motivational Example for the Numerical Solution of Two-Point Boundary-Value Problems," SIAM Review, Sep. 1995, vol. 37, No. 3, pp. 423-427, published by the Society for Industrial and Applied Mathematics, http://www.jstor.org/stable/2132661.

Penner, A.R., "The Physics of Putting," Canadian Journal of Physics, vol. 80, 2002, pp. 1-14, published on the NRC Research Press website at http://cjp.nrc.ca, Feb. 13, 2002.

Holmes, Brian W., "Putting: How a Golf Ball and Hole Interact," American Journal of Physics, vol. 59, No. 2, Feb. 1991, pp. 129-136, published by the American Association of Physics Teachers, http://dx.doi.org/10.1119/1.16592.

Lorensen et al., "Golf Green Visualization," IEEE Computer Graphics and Applications, Jul. 1992, pp. 35-44.

Witters et al., Rolling and Sliding Resistive Forces on Balls Moving on a Flat Surface, American Journal of Physics, vol. 54, No. 1, Jan. 1986, pp. 80-83, published by the American Association of Physics Teachers, http://dx.doi.org/10.1119/1.14747.

Bopp et al., "An Orientation and Calibration Method for Non-Topographic Applications," Photogrammetric Engineering and Remote Sensing, vol. 44, No. 9, Sep. 1978, pp. 1191-1196.

Snow, Kyle, "Topics in Total Least-Squares Adjustment within the Errors-in-Variable Model: Singular Cofactor Matrices and Prior Information," Dissertation, Graduate Program in Geodetic Science and Surveying, School of Earth Sciences, The Ohio State University, 2012, 132 pgs.

US Sky Golf Store, "SkyCaddie TOUCH®, The Next Generation Rangefinder®," downloaded Nov. 11, 2014 from https://shop.skygolf.com/p-1430-skycaddie-touch-pre-order.aspx, 2 pgs.

International Search Report and Written Opinion dated Aug. 24, 2015, in connection with International Patent Application No. PCT/US14/72326, 16 pgs.

Invitation to Pay Additional Fees dated Mar. 27, 2015, in connection with International Patent Application No. PCT/US14/72326, 5 pgs.

* cited by examiner

METHOD AND APPARATUS FOR PRECISE DETERMINATION OF A POSITION OF A TARGET ON A SURFACE

CROSS-REFERENCE TO RELATED APPLICATIONS

This application is a divisional of U.S. patent application Ser. No. 16/595,865, filed Oct. 8, 2019, which is a divisional of prior U.S. patent application Ser. No. 14/581,389, filed Dec. 23, 2014, now U.S. Pat. No. 10,478,706, which claims the benefit of U.S. Provisional Application No. 61/920,910 filed Dec. 26, 2013, all of which are incorporated herein by reference in their entirety.

BACKGROUND OF THE INVENTION

The present invention relates generally to target location and, more particularly, to determining the precise location of a target on a surface.

Golf is a very popular sport but demanding in terms of the various skills that need to be applied by the individual golfer to play the sport at even the most basic level. A golfer's basic swing technique is governed by many factors including his (or her) coordination and strength, golf club selection, golf ball selection, and golf course conditions, to name just a few.

One of the most critical keys to success in golf is for the golfer to accurately determine the distance between himself and any particular point on the golf course. Each shot taken by a golfer during a golf round requires some type of distance determination in order to effectively strike the golf ball. An average eighteen (18) hole golf course has golf fairways that typically range between one hundred (100) hundred yards to over six hundred (600) yards. Therefore, the ability to determine accurate distances influences the ultimate club selection and swing made by the golfer to strike the golf ball on a desired path and towards a selected target. As such, given the mass popularity of golf and the never ending desire for golfers of all skill levels to constantly improve their games, there are many techniques and devices that a golfer may use to assist in determining these distances to improve performance, skill level and overall enjoyment.

Some of the more common techniques and devices for determining golf-related distances are course markers, course yardage books, portable devices having global positioning system (GPS) receivers and laser rangefinders. Course markers are typically found at pre-determined locations across a given golf course in the form of permanent markers fixed in the fairways of the course. Distances from such markers are usually given to the center (and, many times, front and center) of the green that is associated with a particular fairway. As such, given the coarse accuracy of these pre-determined distances, the golfer is left on his own to calculate a more exact distance for a particular golf shot under specific playing conditions.

Course yardage books are typically available at a particular golf course and provide detailed printed yardage information on a golf hole-by-hole basis and contain a picture view of each hole showing the fairway's shape, distances from the tee box to various points on a particular hole (e.g., a water hazard or bunker) and distances from fixed points on the fairway to the associated green. Despite this increased information, the golfer is still basically left on his own to determine more exact distances for a particular golf shot. Further, deciphering and utilizing such course yardage books in an efficient manner during a round of golf can be challenging for the casual golfer.

Over the past few years, portable handheld devices with GPS receivers and laser rangefinders have been quickly adopted by the golfing industry and golfers as major game improvement aids. Positions from GPS receivers can be used to compute distances to features on a golf course and have been adapted to a variety of handheld devices including, but not limited, to smartphone applications. Current commercial units include many advanced features such as preloaded (ready-to-play), worldwide golf course maps, color touchscreen displays, Bluetooth® connectivity, and digital scorecards. Golfers carry such GPS-equipped devices with them during a round and obtain real-time distance information from the units. Of course, as will be appreciated, the precision of some GPS devices is still somewhat coarse and might vary by 10 to 15 yards, which can adversely impact club selection, for example.

Laser rangefinders are manually held, distance measuring instruments that a golfer operates by focusing and pointing the unit's viewfinder cross-hairs on a desired target (e.g., a flagstick) then triggers the unit to measure the given distance. However, the accuracy of such devices depends heavily on the golfer's ability to hold the rangefinder in a steady and stable fashion in order to avoid inaccurate results.

Each of the above-described golfing aides is primarily directed at a golfer's so-called "full swing" shot taken from a teeing area or a golf fairway in order to advance the golf ball towards the green as opposed to the putting of the golf ball which occurs on the green. The information directed to, and useful for, putting in these types of aides is somewhat limited in terms of assisting a golfer in training for a particular putting stroke or executing a real-time putt during a round of golf. Interestingly, putting comprises a large percentage (e.g., 25-30 percent) of the overall number of strokes made during a standard round of golf, and a putt, in both professional golf tournaments and recreational play, can create some of the greatest drama during a round as reflected in the well-known golf adage "drive for show, putt for dough" that is often repeated by golf professionals, amateurs, spectators and broadcasters.

So, while some existing golf aides may be useful in providing general information related to putting, the golfer is still challenged with digesting the general information and effectively utilizing that information to determine how to strike a particular golf putt in a real-time fashion. Important to that real-time determination is the precise location of the golf ball on the green, the precise location of the golf cup (or hole) and the overall surface characteristics of the green, including its topography and so-called green speed.

Therefore, a need exists for an improved technique for real-time determination of the precise location of a target on the surface of a putting green, and, more particularly, a golf ball and/or golf hole on the green to enhance a golfer's putting ability and accuracy.

BRIEF SUMMARY OF THE INVENTION

In accordance with various embodiments, the precise location of a target (e.g., a golf ball or golf hole) is determined by utilizing a plurality of objects that are fixed in their locations and positioned proximate to the target to be located, thereby constituting a plurality of fixed reference points that can effectively be utilized in determining the precise location of the target.

In accordance with an embodiment, the target location is determined by employing a multi-image photogrammetric methodology. More particularly, at least two photographic images of the target are required, where the two images each show the target together with all or some of the proximally located fixed reference points. From these two images of the target and fixed reference points, estimation is made of the precise location of the target using multi-image photogrammetry. Illustratively, in accordance with an embodiment, a determination is made of which ones of the fixed reference points appear in both of the images and particular ones of these overlapping reference points are selected for use in the location determination by applying multi-image photogrammetric methods to estimate the location of the target. Illustratively, in accordance with an embodiment, the target is a golf ball located on the surface of a golf green where the golf green has a plurality of fixed reference points proximally located thereabout (e.g., a plurality of sprinklers heads proximally located around the golf green). In accordance with this embodiment, two images of the golf ball are captured such that each image shows a view of the golf ball together with all or some of the proximally located plurality of sprinkler heads. From the two images, a determination is made as to which ones of the sprinkler heads appear in each image such that multiple ones of the overlapping sprinkler heads will be selected for further use in the multi-image photogrammetric location determination of the target. The actual number of fixed reference points that are required to appear and be identified in both images are in the range of two (2) to five (5), in accordance with various embodiments. Of course, given the nature of the photogrammetry utilized in these embodiments it will be understood that one could also use all of the fixed reference points that appear in both images as well without selecting any subset thereof.

In accordance with an embodiment, the target location is determined by utilizing a plurality of reference points having pre-determined three-dimensional (3D) coordinates in combination with a plurality of distance measurements between the target and various ones of the fixed reference points. Illustratively, in accordance with an embodiment, the target is a golf ball or golf cup (hole) located on the surface of golf green where the golf green has a plurality of fixed reference points proximally located thereabout (e.g., a plurality of sprinklers heads proximally located around the golf green). In accordance with this embodiment, multiple fixed reference points are selected (illustratively, through a registration process) and a distance between the target and each of the selected fixed reference points is measured (illustratively, using a laser rangefinder or other suitable distance measuring device). Thereafter, the precise location of the target is determined as a function of the measured distances (i.e., the multiple measured distances between the golf ball and the respective fixed reference points, as registered).

In accordance with an embodiment, the target location is determined by incorporating a so-called Digital Elevation Model (DEM) that can be used to generate a contour map associated with the surface (e.g., a golf green) on which the target is located in conjunction with at least two measured distances between the target and two fixed reference points. In accordance with the embodiments herein, the DEM is a digital representation of a continuous topographical surface taken from a discrete set of 3D points. That is, in order to facilitate a user's ability to read a contour map, the DEM is used to render contour lines on the surface which represent lines of constant elevation. As such, and as will be readily understood, the 3D topographic surface is depicted as a 2D map (commonly referred to as a contour map). Such DEM information, in combination with the two measured distances, can then be used to determine the precise target location by iteratively interpolating the elevation of the green at the target location.

These and other advantages of the invention will be apparent to those of ordinary skill in the art by reference to the following detailed description and the accompanying drawings.

DETAILED DESCRIPTION

In accordance with various embodiments, the precise location of a target (e.g., a golf ball or golf hole) is determined by utilizing a plurality of objects that are positioned proximate to a golf green, thereby constituting a set of reference points, upon which the target (or targets) resides or is otherwise located. For clarity and ease of explanation, it will be understood that throughout the discussion herein below the determination of the precise location of a target shall apply equally to more than one target (i.e., multiple targets).

Figure 1:
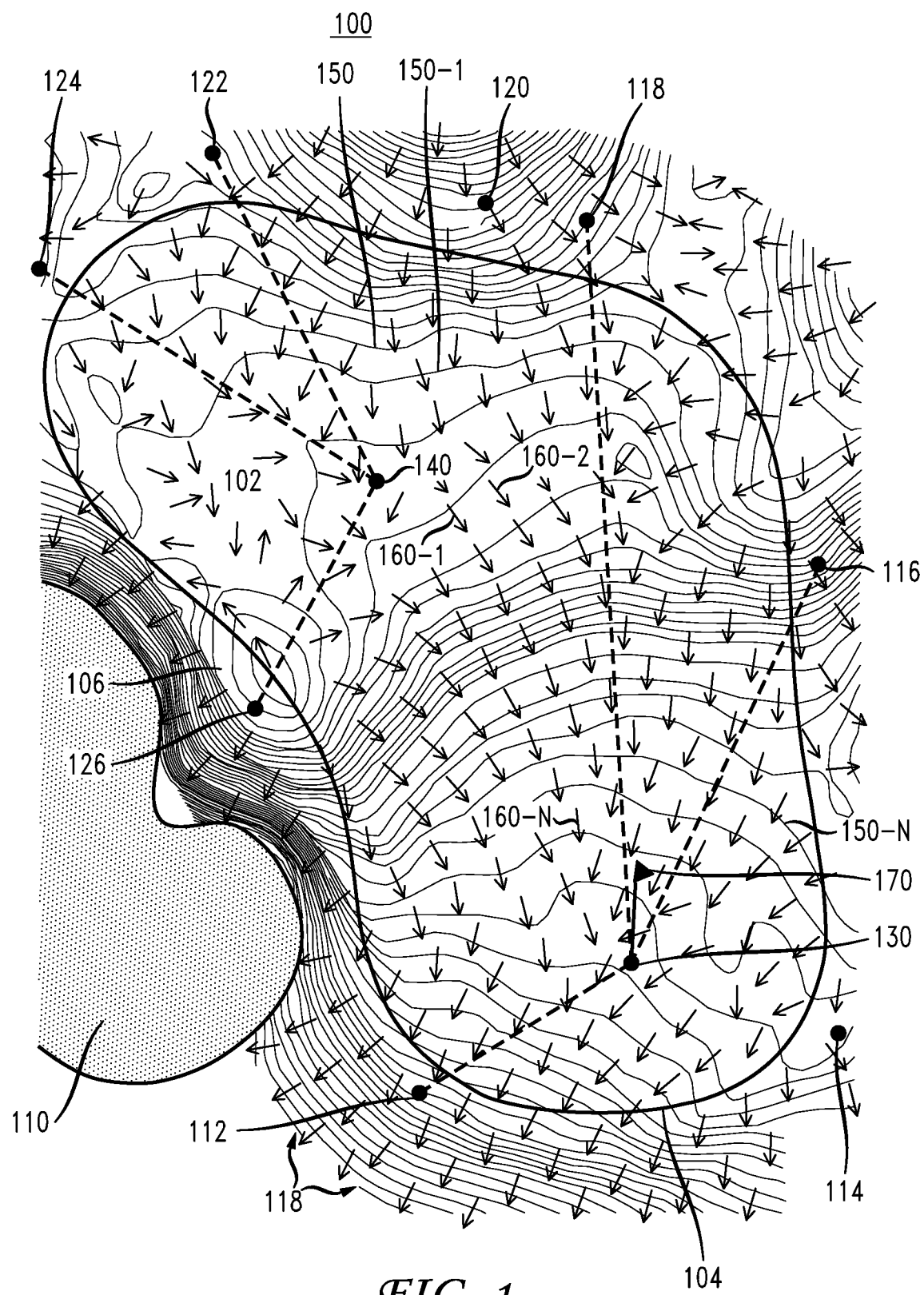
FIG. 1 shows an illustrative contour map configured in accordance with various embodiments.

FIG. 1 shows an illustrative contour map 100 configured in accordance with various embodiments. As shown, green 102 is an individual green, which in accordance with a typical golf course layout would be one of eighteen (18) greens located therein. Green 102 has a border 104 (or sometimes called a transition area) that transitions the green surface (typically the shortest cut of grass on a golf course and different type of grass) through a fringe 106 (typically an area having another cut of grass different from the green and immediately surrounding the green surface) and thereafter to a fairway 108 (typically a different cut of grass from the green and fringe area as well as a different type of grass). The surface contour of a green remains substantially unchanged after the original construction of the green (of course, nothing would preclude a contour change should a change in the surface topography be warranted or desired) such that so-called contour lines 150-1, 150-2 through 150-$n$ and so-called "falls" indicated by directional lines or arrows 160-1, 160-2 through 160-$n$ are established and can be recorded for reference. As will be appreciated, such contour lines and directional lines or arrows (such directional lines or arrows being a derivative of the contour lines) are important indicators with respect to the specific contour of a green in terms of characteristics such as shape, speed, slope and break. Green 102 is also shown having bunker 110 which is typically filled with sand and which captures golf shots that miss landing and/or staying on green 102.

In order to properly irrigate a golf course (e.g., areas such as green 102, fringe 106 and fairway 108), it is typical to use a network of sprinklers that periodically (e.g., on an automated schedule) water these various areas for a predetermined time period. Illustratively, this sprinkler network is defined, in part, by a plurality of sprinkler heads 112-126 that encircle and are located proximally to green 102, and are permanently embedded throughout fringe 106 and fairway 108 in some predetermined configuration to deliver the desired irrigation. Advantageously, the plurality of sprinkler heads 112-126 (and, as will be appreciated, the broader sprinkler network across a given golf course of which they form a part of) constitute a set of fixed reference points when their 3D coordinates have been determined in a suitable coordinate system (e.g., a localized 3D Cartesian coordinate system). In accordance with various embodiments, the plurality of fixed reference points (e.g., the plurality of sprinkler heads 112-126) will be utilized to determine the location of a target on green 102. It will be understood that other fixed objects proximate to or near green 102 can also be used to determine the target location (provided that their 3D coordinates have been pre-determined) including, but not limited to, drain covers, placards, signage, structures, grandstands, and equipment.

FIG. 1 illustrates the determination of the location of targets 130 and 140, respectively, in accordance with various embodiments for determining the location of a target, e.g., target 130 and target 140. As shown, the plurality of sprinkler heads 112-126 are proximally located to green 102. Illustratively, target 130 is a golf cup cut into green 102 with flagstick 170 (or sometimes also referred to as the "pin") set therein, and target 140 is a golf ball on green 102. As will be appreciated, the location of a golf cup (or pin) can change from day-to-day for any given golf course but typically not within the same day or golf round.

More particularly, the determination of the location for target 130 is shown utilizing sprinkler heads 112, 116 and 118, respectively, and the determination of the location for target 140 is shown utilizing sprinkler heads 122, 124 and 126, respectively. As will be appreciated, in accordance with further illustrative embodiments, the number of fixed reference points utilized may be greater than three and the number of targets to be located may greater than one.

Figure 2:
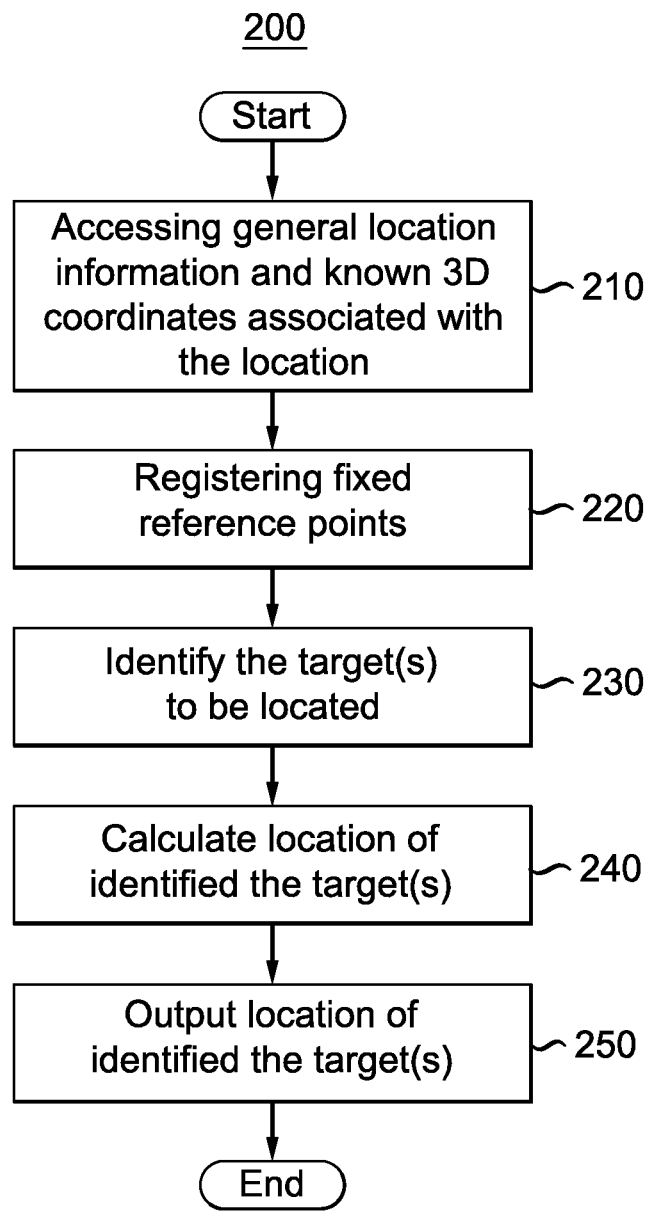
FIG. 2 shows a flowchart of illustrative operations for determining the precise location of a target, using the contour map of FIG. 1, in accordance with various embodiments.
Figure 6:
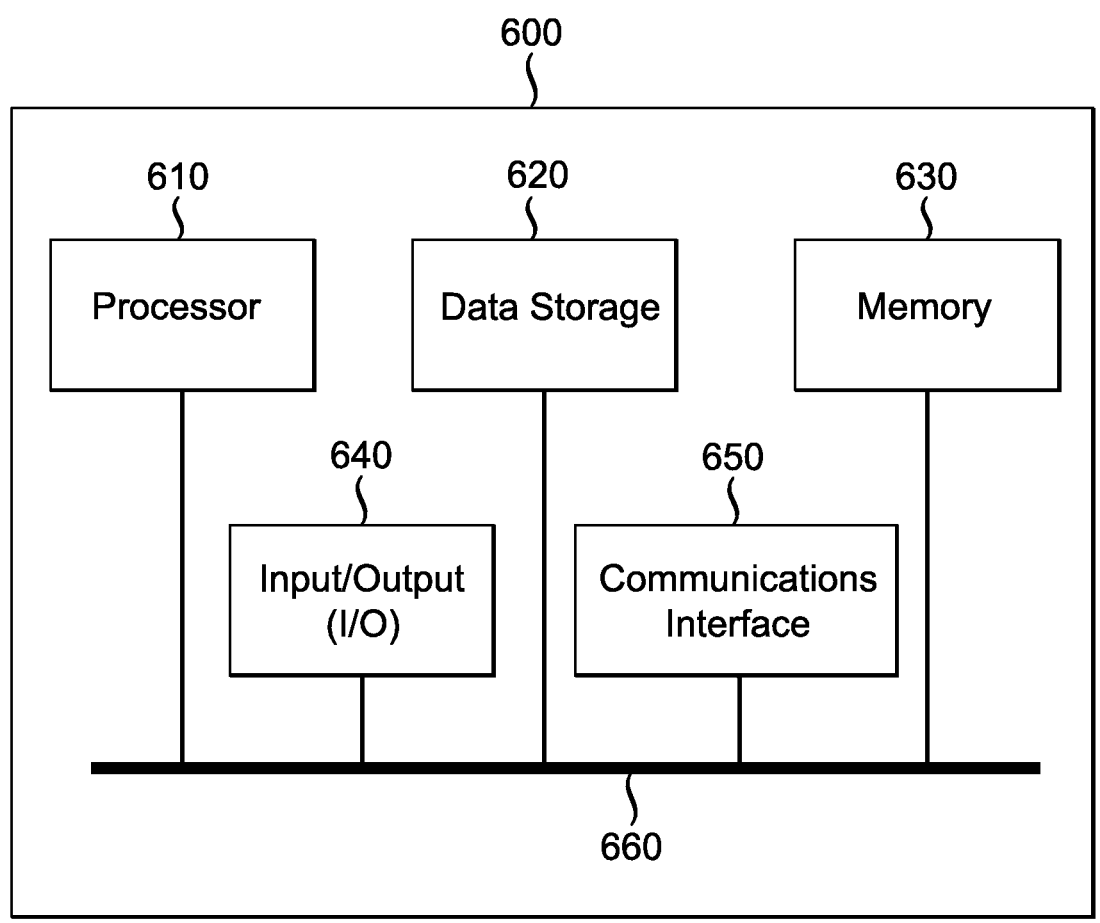
FIG. 6 is a high-level block diagram of an exemplary computer in accordance with an embodiment.

FIG. 2 shows a flowchart of illustrative operations 200 for determining the precise location of a target, using contour map 100 of FIG. 1, in accordance with various embodiments. In particular, access to general location information and known 3D coordinates (see, block 210) specific to a general location serves as initial input. That is, in accordance with an embodiment, the known 3D coordinates of each sprinkler head of the plurality of sprinkler heads 112-126, as proximally located to green 102, are pre-determined and, illustratively, preloaded into a user device. FIG. 6 shows an illustrative embodiment of such a user device and is described further herein below. As will be appreciated, the user device of such an embodiment can be adapted to operate as or with any number of commercially available devices such as a handheld GPS device, rangefinder or smartphone that the user (e.g., a golfer, caddy, instructor, rules official, etc.) carries with them during a round of golf. An example of one such commercially available device is the SkyCaddie® TOUCH available from SkyGolf®. As will also be appreciated, such a device can be pre-loaded with map information or updated in real-time by the user by any number of known communications methods (e.g., a wireless communication). In accordance with various embodiments, such map information may be as depicted in contour map 100 as shown in FIG. 1 herein.

As shown in FIG. 2, the user registers particular fixed reference points (see, block 220). Again, each of the sprinkler heads of the plurality of sprinkler heads 112-126 has a known 3D position that is stored, illustratively, in the user device. In accordance with an embodiment, all or some of the fixed reference points (e.g., plurality of sprinkler heads 112-126) are so registered. Registration, therefore, facilitates the utilization of the fixed reference points in location determination given their known 3D positions. This registration can be accomplished by any number of techniques such as the user hovering or plumbing in some proximity over a particular sprinkler head (e.g., FIG. 1, sprinkler 112) and while in that proximate position the user may depress a button on the user device having a registration control for such registration operation. Illustratively, the registration control can include the use of a camera for imaging the fixed reference points to facilitate their identification and registration.

Now, in accordance with various embodiments, the identification of the target to be located is made (see, block 230) and the location of the target (e.g., FIG. 1, target 130 or target 140) can be calculated (see, block 240) in the coordinate system (e.g., a 3D Cartesian coordinate system) realized by the plurality of fixed reference points constituted by the plurality of sprinkler heads 112-126 as proximally located around the user's location (e.g., the golf green). Various alternative embodiments of the target location determination and operations are described in greater detail herein below.

Finally, once calculated, in accordance with an embodiment, the precise location of the identified target can be outputted (block 250), illustratively, on the display of the user device. Advantageously, in accordance with various embodiments, knowing the precise location of both target 130 (e.g., golf cup) and target 140 (e.g., golf ball) and providing such information to the golfer in conjunction with, illustratively, contour lines 150-1, 150-2 through 150-n and directional arrows 160-1, 160-2 through 160-n, the golfer is better equipped to strike a putt with an improved sense of stroke (i.e., how hard to strike the golf ball) and alignment (i.e., direction and break between the golf ball and the golf cup). As such, the embodiments herein can serve as a practical training aid for a golfer in improving their putting technique and/or a real-time playing aid for improving putting confidence and results.

Figure 3:
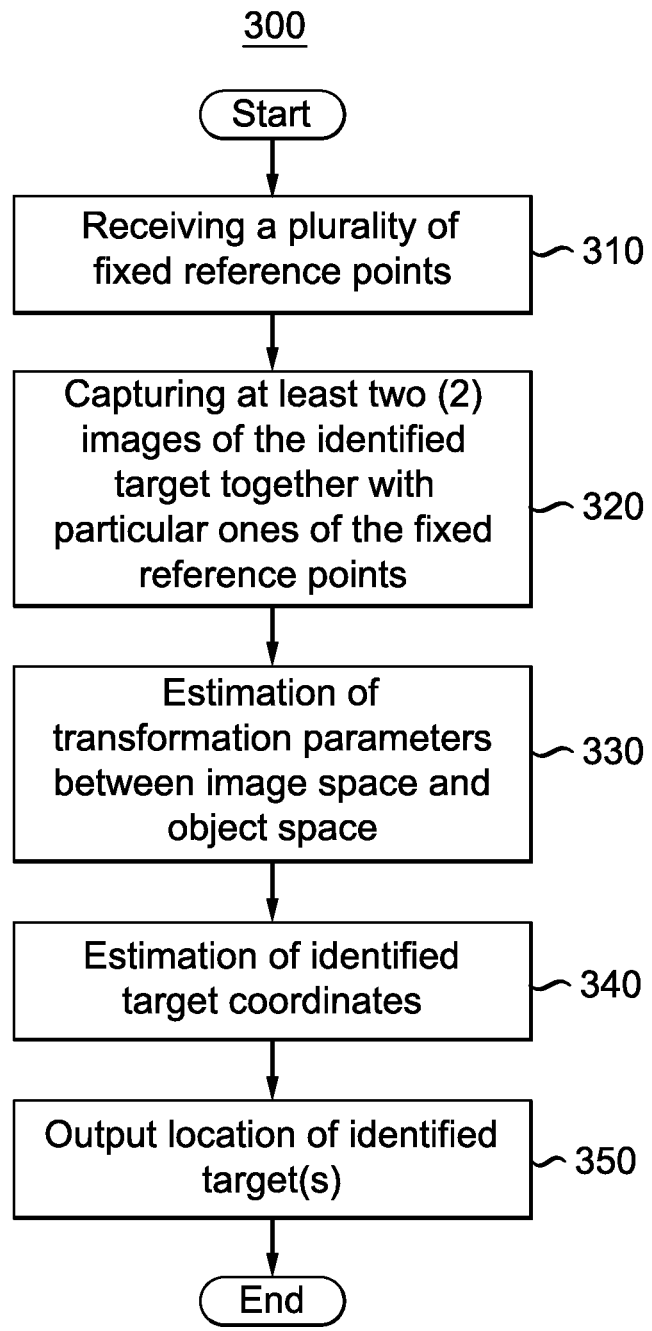
FIG. 3 shows a flowchart of illustrative operations for determining a precise target location by utilizing multi-image photogrammetry in accordance with an embodiment.

FIG. 3 shows a flowchart of illustrative operations 300 for determining a target location by utilizing multi-image photogrammetry in accordance with an embodiment. As will be appreciated, photogrammetry is the science of making measurements from photographs including recovering accurate positions of surface points. Photogrammetry techniques have been applied in a variety of fields including surveying, topographic mapping, architecture, civil engineering, quality control, manufacturing, archeology and geology. In accordance with this embodiment, at least two (2) images of the identified target (e.g., target 130 or target 140) are captured (see, block 320) together with all or some of a plurality of fixed reference points that are known or otherwise received (see, block 310). The capturing of these two images can be accomplished from a stand-alone camera or a user device equipped with a camera for such purpose (e.g., having close range photogrammetry capability). As will be appreciated, the method is suitable for both metric and non-metric cameras.

Once the two images of the target are captured, an estimation of transformation parameters between image space (e.g., camera) and object space (e.g., golf green) is made (see, block 330) and as further detailed herein below. That is, from the two captured images of the target, a determination is made as to which ones of the plurality of fixed reference points appear in both images and using a set of overlapping (i.e., appearing in both images) reference points the location determination for the target is made. As will be appreciated, the identification of the fixed reference points in the images can be made using any number of well-known object recognition routines or suitable auto-detection methods for identifying reference points on images. In a general case, up to five reference points must appear in both images. The actual number of fixed reference points that are required to appear in both images are illustratively in the range of two (2) to five (5), in accordance with various embodiments, as further discussed below. Of course, given the nature of the photogrammetry utilized in these embodiments it will be understood that one could also use all of the fixed reference points that appear in both images as well without selecting any subset thereof.

In accordance with this embodiment, input data includes image space coordinates $(x_t, y_t)$ of the target, image space coordinates $(x_i, y_i)$ and object space coordinates $(X_i, Y_i, Z_i)$ i=1, . . . , n, of n unique reference points. With the transformation parameters estimated for two or more images, an estimate of the coordinates of the target is made (see, block 340) and the precise location of the identified target can be outputted (see, block 350), illustratively, on the display of the user device. Output results include estimated object space coordinates $(X_t, Y_t, Z_t)$ of the target.

Determining target location by multi-image photogrammetry in accordance with this embodiment is illustratively based on a nonlinear extension of the so-called "Direct Linear Transformation (DLT) model", which is recognized as an "uncalibrated camera model," since it is suitable for both non-metric and metric cameras. See, e.g., Bopp, H. and H. Krauss (1978), "An orientation and calibration method for non-topographic applications," *Photogrammetric Engineering and Remote Sensing*, Vol. 44, No. 9, pp. 1191-1196, American Society of Photogrammetry; Luhmann, T., S. Robson, S. Kyle, and I. Harley (2011). "*Close Range Photogrammetry: Principles, Techniques and Applications*." Whittles Publishing, Scotland, UK; and Mikhail, E. M., J. S. Bethel, and J. C. McGlone (2001). "*Introduction to Modern Photogrammetry*." John Wiley & Sons, New York, each of which is incorporated by reference herein for all purposes.

In the DLT model the collinearity equations that relate image space coordinates (x,y) to object space coordinates (X,Y,Z) can be represented by the linear fractional functions $$x = \frac{b_{11}X + b_{12}Y + b_{13}Z + b_{14}}{b_{31}X + b_{32}Y + b_{33}Z + 1},$$

$$y = \frac{b_{21}X + b_{22}Y + b_{23}Z + b_{24}}{b_{31}X + b_{32}Y + b_{33}Z + 1},$$
(1)

Where $b_{ij}$ are 11 unknown transformation parameters associated with each camera image that must be estimated. These are the basic equations of the DLT model.

The system of equations (1) is over-parameterized since only nine (9) of the eleven (11) unknown parameters $b_{ij}$ are independent, a condition that is treated by imposing two (non-linear) constraints between the parameters as explained in the following:

A scaling parameter $\lambda$ is defined as $$\lambda^{-2} := b_{31}^2 + b_{32}^2 + b_{33}^2$$ (2)

for use in the definition of the principal point coordinates $(x_p, y_p)$ and the principal distance c shown in the following relations:

$$x_p = (b_{11}b_{31} + b_{12}b_{32} + b_{13}b_{33})\lambda^2, \quad y_p = (b_{21}b_{31} + b_{22}b_{32} + b_{23}b_{33})\lambda^2$$ (3)

$$c^2 = (b_{11}^2 + b_{12}^2 + b_{13}^2)\lambda^2 - x_p^2$$ (4)

$$c^2 = (b_{21}^2 + b_{22}^2 + b_{23}^2)\lambda^2 - y_p^2$$ (5)

Equating (4) and (5) above and making use of equations (2) and (3), the first (non-linear) constraint between the parameters is provided by $$(b_{11}^2 b_{12}^2 + b_{13}^2) - (b_{21}^2 b_{22}^2 + b_{23}^2) + [(b_{21}b_{31} + b_{22}b_{32} + b_{23}b_{33})^2 - (b_{11}b_{31} + b_{12}b_{32} + b_{13}b_{33})^2](b_{31}^2 + b_{32}^2 + b_{33}^2)^{-1} = 0.$$ (6)

The second (non-linear) constraint between the parameters is $$(b_{11}b_{21} + b_{12}b_{22} + b_{13}b_{23}) - (b_{31}^2 b_{32}^2 + b_{33}^2)^{-1}(b_{11}b_{31} + b_{12}b_{32} + b_{13}b_{33}) \cdot (b_{21}b_{31} + b_{22}b_{32} + b_{23}b_{33}) = 0.$$ (7)

Additional constraints may be imposed upon the unknown parameters $b_{ij}$ if the position and/or exterior orientation of the camera (or user device) is known in the object coordinate system. For example, by plumbing the camera over a known reference point to establish its location and/or using inertial sensors to establish its orientation. Illustratively, in accordance with an embodiment, the user might precisely plumb over a particular sprinkler head (e.g., FIG. 1, sprinkler 112) of the plurality of sprinkler heads and while in that plumbed position the user may depress a button on the user device to register that particular reference point and subsequently, while remaining in the plumbed position, take a picture of the target and various reference points, thereby introducing a priori information about the location of the camera to the routine used to solve for the transformation parameters.

Now suppose n reference station coordinates $(X_i, Y_i, Z_i)$, i=1, . . . , n, are assumed to be known without error in the object coordinate system and are measured as $(x_i, y_i)$ in the image coordinate system with corresponding random measurement errors $(e_{x_i}, e_{y_i})$ being independently and identically distributed. Then equation (1) can be extended as a system of 2n observation equations as:

$$x_i = \frac{b_{11}X_i + b_{12}Y_i + b_{13}Z_i + b_{14}}{b_{31}X_i + b_{32}Y_i + b_{33}Z_i + 1} + e_{x_i},$$ (8)

$$y_i = \frac{b_{21}X_i + b_{22}Y_i + b_{23}Z_i + b_{24}}{b_{31}X_i + b_{32}Y_i + b_{33}Z_i + 1} + e_{y_i},$$

$$[e_{x_1}, e_{y_1}, \cdots, e_{x_n}, e_{y_n}]^T =: e \square (0, \sigma_0^2 I_{2n}),$$ (9)

Equation (9) expresses the stochastic distribution of the random errors, namely their expectation E{e}=0 and dispersion D{e}=$\sigma_0^2 I_{2n}$, where $\sigma_0^2$ is an unknown variance component that could be estimated for variance analysis purposes; 0 is a 2n×1 vector of zeros, and $I_{2n}$ is a 2n×2n identity matrix.

In accordance with a further alternative embodiment, a more general model than the DLT model detailed above is employed which admits random errors in the reference point coordinates (i.e., reference point coordinates $(X_i, Y_i, Z_i)$, i=1, . . . , n, as detailed above) and allows for the utilization of much more general random-error distributions. Such a formulation accounts for statistical uncertainties in the pre-determined reference point coordinates (i.e., as expressed in their variances and covariances), which could result in a more accurate determination of the target location. In this embodiment, an estimation technique is employed that is directed to total-least-squares (TLS) adjustments. See, Snow, K. (2012). "*Topics in total least-squares adjustment within the errors-in-variables model: singular cofactor matrices and prior information.*" Ph.D. Dissertation, The Ohio State University, Columbus, Ohio, USA, which is incorporated by reference herein for all purposes. The model utilized in this alternative embodiment deals with symmetric positive-(semi) definite cofactor matrices that are otherwise quite arbitrary, and the model is useful in applications such as 2D-line fitting and 2-D similarity transformations and, in accordance with various embodiments herein, useful in the estimation of a precise location of an identified target as a function of certain image space coordinates and object space coordinates.

More particularly, the system of equation (8), together with the constraints (6) and (7), can be linearized and written in matrix form as $$y = \underset{2n \times 11}{A}\ \xi_b + e, \qquad (10)$$

$$e \square (0, \sigma_0^2 I_{2n}),$$

$$\underset{2n \times 11}{K}\ \xi_b = 0,$$

where the first line contains the 2n observation equations, and the second line contains the two parameter constraints. The eleven (11) unknown transformation parameters have been collected in the vector:

$$\xi_b := [b_{11} b_{12} b_{13} b_{14} b_{21} b_{22} b_{23} b_{24} b_{31} b_{32} b_{33}]^T.$$

In order to estimate the 11 unknown transformation parameters $\xi_b$, an unbiased estimator $\hat{\xi}_b$ within equation (10) above can be derived from the principle of least-squares minimization. Defining the auxiliary symbols $[N\ c] := A^T [A\ y]$, the estimator can be expressed as $$\hat{\xi}_b = (N + K^T K)^{-1} \cdot \{I - K^T [K(N + K^T K)^{-1} K^T]^{-1} K(N + K^T K)^{-1}\} c. \qquad (11)$$

If the photograph is taken from an arbitrary location and inertial sensors are not used, equation (11) above requires that at least five (5) reference points appear in the camera image. If, however, the photograph is taken from a reference point and/or inertial sensors are used, additional constraints can be added to the model via matrix K, thereby requiring as few as two (2) reference points in the camera image. Nevertheless, equation (11) is nonlinear and thus must be solved by iteration, implying that initial approximate values are needed for all 11 unknown parameters. These quantities can be obtained by solving an unconstrained linear system of at least 11 equations, thus requiring that at least six (6) reference stations appear in the camera image.

With the transformation parameters having been estimated in the preceding step, the object space coordinates $(X_t, Y_t, Z_t)$ of the target (ball or hole) can now be estimated in order to provide the target location. Particularly, for each target point $P_t$, appearing in photograph k, two observation equations can be written in the form of $$x_{t,k} = \frac{b_{11}^k X_t + b_{12}^k Y_t + b_{13}^k Z_t + b_{14}^k}{b_{31}^k X_t + b_{32}^k Y_t + b_{33}^k Z_t + 1} + e_{x_{t,k}}, \qquad (12)$$

$$y_{t,k} = \frac{b_{21}^k X_t + b_{22}^k Y_t + b_{23}^k Z_t + b_{24}^k}{b_{31}^k X_t + b_{32}^k Y_t + b_{33}^k Z_t + 1} + e_{y_{t,k}}.$$

Here, $(x_{t,k}, y_{t,k})$ are the image space coordinates of the target, with associated random errors $(e_{x_{t,k}}, e_{y_{t,k}})$ the coefficients $b_{ij}^k$ where estimated in the previous step as $\hat{\xi}_b^k$, and $(X_t, Y_t, Z_t)$ are the unknown object space coordinates of the target to be estimated. Since two equations can be written in the form of equation (12) for each photograph image, the target must be photographed from at least two locations to solve for its three unknown coordinates.

It is also to be noted that, if all the reference points are located on or near a common plane, the algorithm may become numerically unstable. In this case, when the photograph is taken, one or more reference points effectively could be elevated by use of plumbed poles of known lengths. Alternatively, increased numerical stability may be achieved in accordance with a further alternative embodiment as detailed herein below.

The above described embodiments do not require the photograph to be taken at a reference point. However, if the photograph is taken at a known, fixed reference point (e.g., sprinkler head 112), then values of three (3) exterior camera parameters are known a priori. This additional information can be included in equation (10) as a constraint, potentially adding numerical stability and increased accuracy to the estimation of the target location.

Further, the above described embodiment does not require that the exterior orientation of the camera be known a priori (e.g., from inertial sensors). However, if these parameters are known a priori, this information can be included in equation (10) as a constraint, potentially adding numerical stability and increased accuracy to the estimation of the target location.

The above-described least-squares estimator $\hat{\xi}_b$ (see, equation (11)) is based on the assumption that the elements of the design matrix A are constant and that all data errors are identically and independently distributed. In a further alternative embodiment, a more general technique may be used that allows for randomness in the elements of design matrix A and, in addition, to accommodate more general random-error distributions through applying a so-called Total Least-Squares (TLS) adjustment methodology. Advantageously, such a formulation accounts for statistical uncertainties in the pre-determined reference point coordinates (i.e., as expressed in their variances and covariances), which could result in a more accurate determination of the target location. Such a methodology is described in see, Snow, K. (2012). *Topics in total least-squares adjustment within the errors-in-variables model: singular cofactor matrices and prior information.* Ph.D. Dissertation, The Ohio State University, Columbus, Ohio, USA, which is hereby incorporated by reference for all purposes.

In accordance with a further embodiment, a plurality of known, fixed references points are utilized to determine target location. That is, input data includes 3-D coordinates $(X_i, Y_i, Z_i)$, i=1, . . . , n, of n≥3 unique reference points, and a plurality of unique references to the target, illustratively a plurality of measurements from a distance measuring device (e.g., laser rangefinder), $(R_i)$, i=1, . . . , n, of n≥3 unique reference points of the target. Output data includes estimated 3-D coordinates (X,Y,Z) of the target. If more than three measurements are used, the problem can be solved by least-squares estimation techniques, in which case initial coordinate values $(X^0, Y^0, Z^0)$ are required. These initial values may be determined by any suitable means, such as a unique solution based on any three measurements. Such a unique solution will yield the final target location in the case that the number of measurements to unique reference points is n=3.

Figure 4:
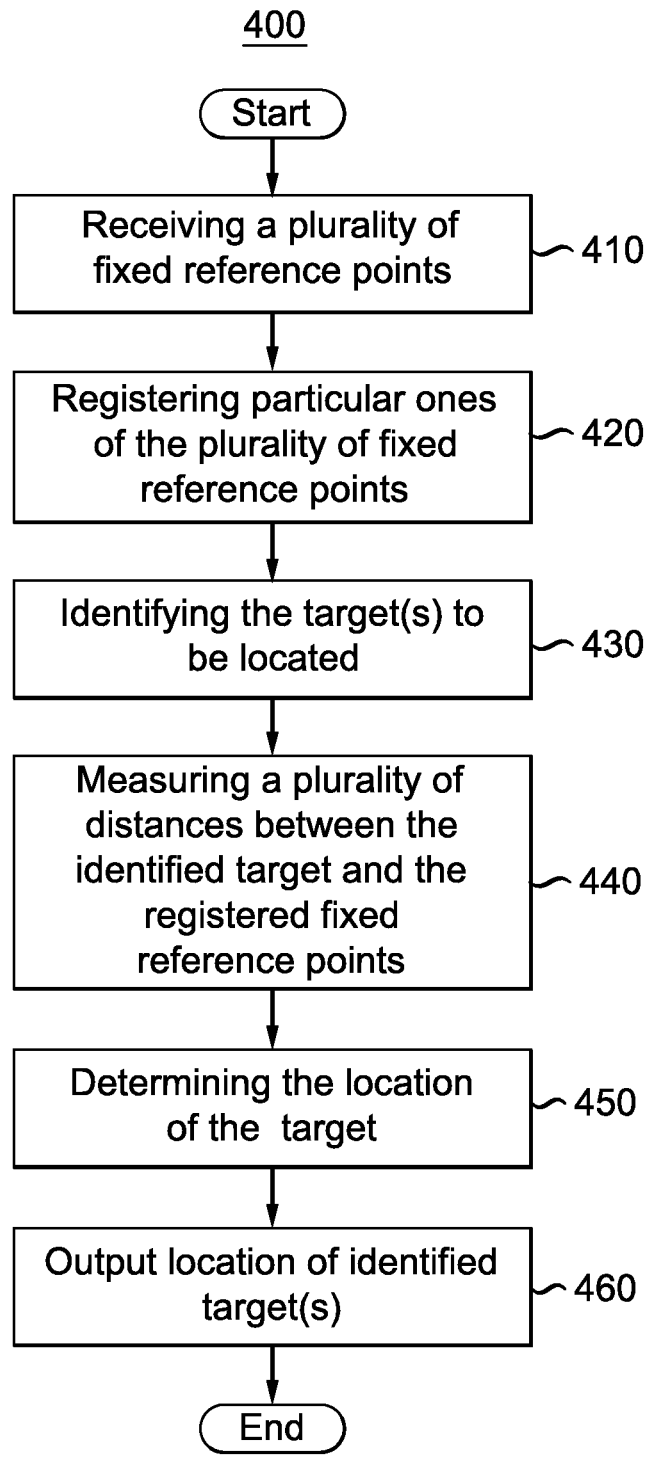
FIG. 4 shows a flowchart of illustrative operation for determining a precise target location by utilizing measured distances between a target and fixed reference points having known coordinates in accordance with an embodiment.

As shown in the illustrative operations 400 in FIG. 4, in accordance with this embodiment, a plurality of known, fixed references points (see, block 410) are utilized to determine a target location. Again, the plurality of fixed reference points are proximally located to the target's location. In accordance with this embodiment, particular ones of the fixed points are identified or registered (see, block 420) for use in the determination of the target location. Illustratively, as detailed herein above, the plurality of fixed reference points are the plurality of sprinkler heads 112-126 and the identification or registration of particular ones of the sprinkler head can be accomplished by any number of techniques such as a user hovering or plumbing in some proximity over a particular sprinkler head (e.g., FIG. 1, sprinkler 112) and while in that proximate position the user may depress a button on a user device programmed for such registration operation to register or identify a current position proximate to that fixed location of such sprinkler head.

Now knowing the location of the particular ones of the fixed reference points, this location information can be used with the identified target (see, block 430) to determine the precise location of the target on a surface. Illustratively, a laser rangefinder (or some similarly equipped distance measuring device), can be used to determine the distance from the known reference point (e.g., sprinkler head 112) to the target (e.g., target 130 or target 140) and the distance can be provided as input to the user device (see, e.g., FIG. 6). That is, a plurality of distances between the identified target and particular ones of the registered fixed reference points (see, block 440) are measured. In accordance with an embodiment, at least three (3) fixed referenced points are utilized to measure three (3) respective distance measurements with respect to the target. Utilizing this distance information, the location of the target 130 or 140 will be determined (see, block 450) as further detailed below and may be outputted (see, block 460) to the user, illustratively, on the display of the user device.

In accordance with this embodiment, an iterative computation is made of the coordinate correction-vector by $\hat{\xi} = (A^T A)^{-1} A^T y$ using the least-squares estimation technique, where the n×3 design matrix A is defined by $$A = \begin{bmatrix} \frac{X^j - X_1}{R_1^c} & \frac{Y^j - Y_1}{R_1^c} & \frac{Z^j - Z_1}{R_1^c} \\ \vdots & \vdots & \vdots \\ \frac{X^j - Y_n}{R_n^c} & \frac{Y^j - Y_n}{R_n^c} & \frac{Z^j - Z_n}{R_n^c} \end{bmatrix}, \quad (13)$$

and y is an n×1 vector of incremental observations defined by $y = [R_1 - R_1^c \quad . \quad . \quad . \quad R_n - R_n^c]^T$, where $R_i^c = \sqrt{(X^j - X_i)^2 + (Y^j - Y_i)^2 + (Z^j - Z_i)^2}$, i=1, . . . , n. Here, the superscript j denotes the j-th iteration of the computation, j= 1, 2, . . . .

Then, the coordinates of the target point need to be updated by $$\begin{bmatrix} X \\ Y \\ Z \end{bmatrix}^j = \begin{bmatrix} X \\ Y \\ Z \end{bmatrix}^{j-1} + \begin{bmatrix} \hat{\xi}_1 \\ \hat{\xi}_2 \\ \hat{\xi}_3 \end{bmatrix}. \quad (14)$$

The two steps above are repeated until the norm of the vector of estimated coordinate corrections is less than a predefined threshold $\varepsilon$, i.e., $|\hat{\xi}| < \varepsilon$, with, e.g., $\varepsilon = 10^{-12}$.

In accordance with a further embodiment, precise target location is made as a function of two measured distances (between a target and two reference points) and surface elevation information from a contour map (see, FIG. 1, contour map 100) of the green (see, FIG. 1, green 102). As mentioned above, in accordance with the embodiments herein, a DEM is utilized wherein the DEM is a digital representation of a continuous topographical surface taken from a discrete set of 3D points. That is, in order to facilitate a user's ability to read a contour map, the DEM is used to render contour lines on the surface which represent lines of constant elevation. As such, as will be readily understood, the 3D topographic surface is depicted as a 2D map (i.e., the contour map). Such DEM information, in combination with the two measured distances, can then be used to determine the precise target location by iteratively interpolating the elevation of the green at the target location.

Figure 5:
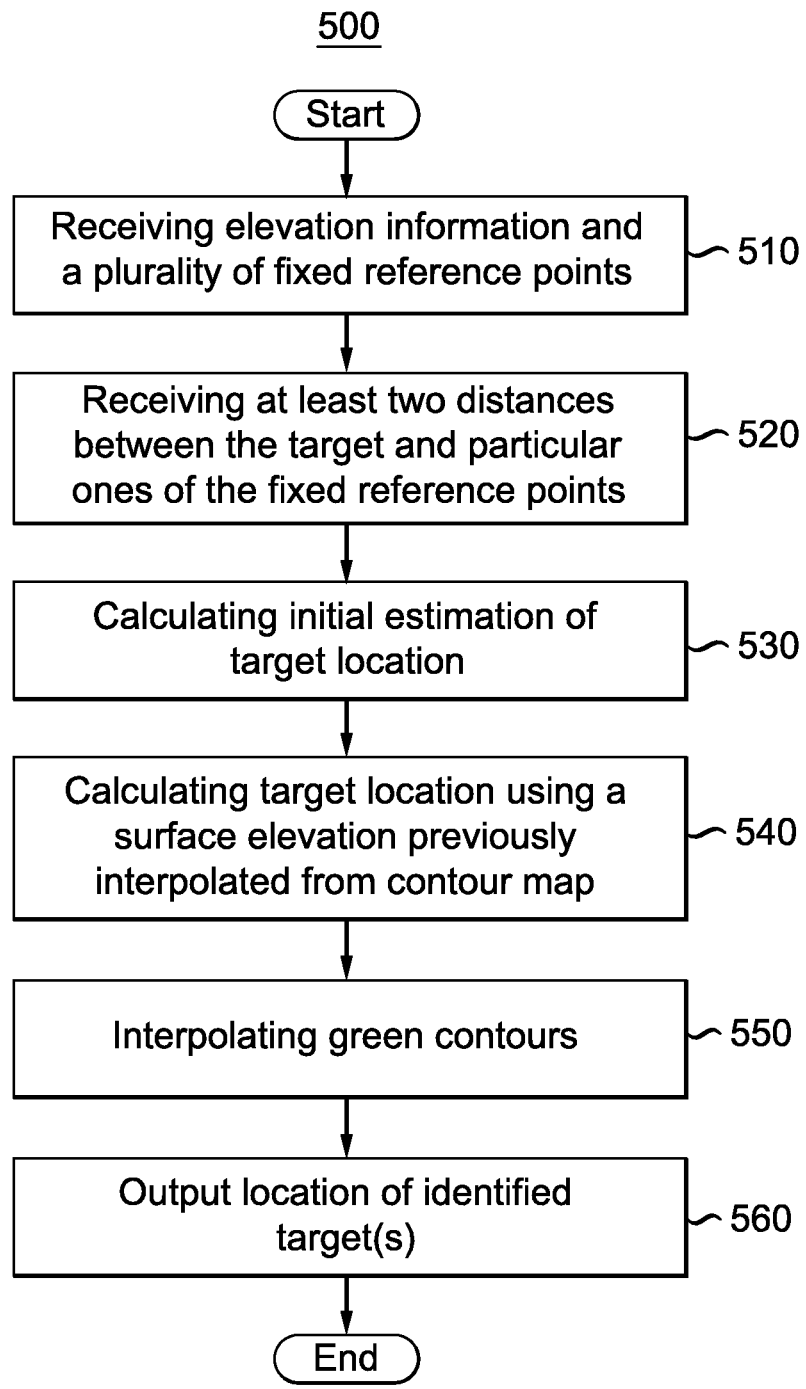
FIG. 5 shows a flowchart of illustrative operations for determining a precise target location on a golf green by utilizing measured distances between a target and select fixed reference points in combination with surface elevation information associated with a golf green in accordance with an embodiment.

FIG. 5 shows a flowchart of illustrative operations 500 for determining a target location by utilizing measured distance information and surface elevation information in accordance with this embodiment. In particular, this embodiment utilizes at least two (2) measured distances between the target and two (2) particular fixed reference points (see, block 520) where such distances are measured using a distance measuring device (e.g., laser rangefinder) as detailed in the preceding embodiment. However, in accordance with this alternative embodiment, surface elevation information is received (block 510) that details elevation information specific to a green (e.g., green 102). As will be appreciated, such elevation information may be part of the generated contour map 100 that is pre-loaded on a user device or downloaded by the user in real-time.

The elevation information from contour map 100 of green 102 may then be incorporated into an iterative solution for determining the precise 3D target location, in combination with the two measured distances between the target and the particular two reference points of the fixed reference points. This is achieved by calculating an initial estimation of the target location (see, block 530), and then more precisely calculating the target location from that initial estimation by using a surface elevation previously interpolated from the contour map (see, block 540) as a first iteration step and then interpolating the contours of the green (see, block 550) more precisely at each successive step in the iteration scheme. As will be appreciated, the iterative process will continue until successive calculations of the target location reach some pre-defined tolerance or desired accuracy.

It is to be noted that direct interpolation of the contours could be employed if the contour map is represented digitally (e.g., an underlying triangulated irregular network (TIN) model); however, if the contours are represented by a graphical image file (e.g., JPEG file) instead, they would first have to be digitized before numerical interpolation is performed. The determined location of the target may then be outputted (see, block 560), illustratively, by displaying the location on a display.

As detailed above, the various embodiments herein can be embodied in the form of methods and apparatuses for practicing those methods. The disclosed methods may be performed by a combination of hardware, software, firmware, middleware, and computer-readable medium (collectively "computer") installed in and/or communicatively connected to a user device. FIG. 6 is a high-level block diagram of an exemplary computer 600 that may be used for implementing a method for determining a precise location of a target on a surface in accordance with the various embodiments herein. Computer 600 comprises a processor 610 operatively coupled to a data storage device 620 and a memory 630. Processor 610 controls the overall operation of computer 600 by executing computer program instructions that define such operations. Communications bus 660 facilitates the coupling and communication between the various components of computer 600. The computer program instructions may be stored in data storage device 620, or a non-transitory computer readable medium, and loaded into memory 630 when execution of the computer program instructions is desired. Thus, the steps of the disclosed method (see, e.g., FIGS. 2-5 and the associated discussion herein above) can be defined by the computer program instructions stored in memory 630 and/or data storage device 620 and controlled by processor 610 executing the computer program instructions. For example, the computer program instructions can be implemented as computer executable code programmed by one skilled in the art to perform the illustrative operations defined by the disclosed method. Accordingly, by executing the computer program instructions, processor 610 executes an algorithm defined by the disclosed method. Computer 600 also includes one or more communication interfaces 650 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Computer 600 also includes one or more input/output devices 640 that enable user interaction with computer 600 (e.g., camera, display, keyboard, mouse, speakers, microphone, buttons, etc.).

Processor 610 may include both general and special purpose microprocessors, and may be the sole processor or one of multiple processors of computer 600. Processor 610 may comprise one or more central processing units (CPUs), for example. Processor 610, data storage device 620, and/or memory 630 may include, be supplemented by, or incorporated in, one or more application-specific integrated circuits (ASICs) and/or one or more field programmable gate arrays (FPGAs).

Data storage device 620 and memory 630 each comprise a tangible non-transitory computer readable storage medium. Data storage device 620, and memory 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 640 may include peripherals, such as a camera, printer, scanner, display screen, etc. For example, input/output devices 640 may include a display device such as a cathode ray tube (CRT), plasma or liquid crystal display (LCD) monitor for displaying information to the user, a keyboard, and a pointing device such as a mouse or a trackball by which the user can provide input to computer 600.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining a location of a target on a surface, the surface having a plurality of fixed reference points located proximally thereabout, the method comprising:
    capturing, by a camera, at least a first image and a second image of the target, each of the first image and the second image being a photographic image, the first image and the second image each including a view of the target together with particular ones of the plurality of fixed reference points; and
    determining the location of the target based on the first image and the second image by:
        identifying, from the particular ones of the plurality of fixed reference points, a set of fixed reference points that are included in both the first image and the second image;

estimating a set of transformation parameters between an image space and an object space of the plurality of fixed reference points that are included in both the first image and the second image to form a set of transformed fixed reference points; and using the set of transformed fixed reference points to determine the location of the target.

2. The method of claim 1, wherein the determining the location of the target based on the first image and the second image uses multi-image photogrammetry.

3. The method of claim 2, wherein the multi-image photogrammetry includes a direct linear transformation model.

4. The method of claim 1,
wherein the set of transformation parameters is estimated as a function of image space coordinates $(x_t, y_t)$ of the target, image space coordinates $(x_i, y_i)$ associated with each of the first image and the second image, and object space coordinates $(X_i, Y_i, Z_i)$ associated with each one of the plurality of fixed reference points.

5. The method of claim 1, further comprising:
displaying the location of the target.

6. An apparatus for determining a location of a target on a surface, the surface having a plurality of fixed reference points located proximally thereabout, the apparatus comprising:
a registration control for registering particular ones of the plurality of fixed reference points;
an imager for capturing at least a first image and a second image of the target, each of the first image and the second image being a photographic image, the first image and the second image each showing the target together with particular ones of the plurality of fixed reference points; and
a processor, for executing computer program instructions stored in a memory, which when executed by the processor, cause the processor to perform operations comprising:
determining the location of the target based on the first image and the second image by:
identifying, from the particular ones of the plurality of fixed reference points, a set of fixed reference points that are included in both the first image and the second image;
estimating a set of transformation parameters between an image space and an object space of the plurality of fixed reference points that are included in both the first image and the second image to form a set of transformed fixed reference points; and
using the set of transformed fixed reference points to determine the location of the target.

7. The apparatus of claim 6, further comprising:
a memory for storing a map of the surface and coordinates of the plurality of fixed reference points; and
a display for displaying the location of the target.

8. The apparatus of claim 6, wherein the imager is a camera.

9. The apparatus of claim 6, wherein the location of the target is determined using multi-image photogrammetry.

10. A non-transitory computer-readable medium storing computer program instructions for determining a location of a target on a surface, the surface having a plurality of fixed reference points located proximally thereabout, which when executed on a processor, cause the processor to perform operations comprising:
capturing, from a camera, at least a first image and a second image of the target, each of the first image and the second image being a photographic image, the first image and the second image each showing the target together with particular ones of the plurality of fixed reference points; and
determining the location of the target based on the first image and the second image by:
identifying, from the particular ones of the plurality of fixed reference points, a set of fixed reference points that are included in both the first image and the second image;
estimating a set of transformation parameters between an image space and an object space of the plurality of fixed reference points that are included in both the first image and the second image to form a set of transformed fixed reference points; and
using the set of transformed fixed reference points to determine the location of the target; and
displaying the location of the target.

11. The non-transitory computer-readable medium of claim 10, wherein the location of the target is determined using multi-image photogrammetry.

* * * * *

UNITED STATES PATENT AND TRADEMARK OFFICE
CERTIFICATE OF CORRECTION

PATENT NO. : 11,738,252 B2
APPLICATION NO. : 17/321540
DATED : August 29, 2023
INVENTOR(S) : Raymond M. O'Connor et al.

It is certified that error appears in the above-identified patent and that said Letters Patent is hereby corrected as shown below:

In the Specification

Column 8, Line 5:

$\lambda^{-2} := b_{31}^2 + b_{32}^2 + b_{33}^2$         (2)

Should read:

$$\lambda^{-2} := b_{31}^2 + b_{32}^2 + b_{33}^2 \qquad (2)$$

Column 8, Line 13:

$c^2 = (b_{11}^2 + b_{12}^2 + b_{13}^2)\lambda^2 - x_p^2$      (4)

Should read:

$$c^2 = \left(b_{11}^2 + b_{12}^2 + b_{13}^2\right)\lambda^2 - x_p^2 \qquad (4)$$

Column 8, Line 15:

$c^2 = (b_{21}^2 + b_{22}^2 + b_{23}^2)\lambda^2 - y_p^2$      (5)

Should read:

$$c^2 = \left(b_{21}^2 + b_{22}^2 + b_{23}^2\right)\lambda^2 - y_p^2 \qquad (5)$$

Column 8, Line 20:

$(b_{11}^2 + b_{12}^2 + b_{13}^2) - (b_{21}^2 + b_{22}^2 + b_{23}^2) + [(b_{21}b_{31} + b_{22}b_{32} + b_{23}b_{33})^2 - (b_{11}b_{31} + b_{12}b_{32} + b_{13}b_{33})^2](b_{31}^2 + b_{32}^2 + b_{33}^2)^{-1} = 0.$    (6)

Should read:

$$\left(b_{11}^2 + b_{12}^2 + b_{13}^2\right) - \left(b_{21}^2 + b_{22}^2 + b_{23}^2\right) + \left[\left(b_{21}b_{31} + b_{22}b_{32} + b_{23}b_{33}\right)^2 - \left(b_{11}b_{31} + b_{12}b_{32} + b_{13}b_{33}\right)^2\right]\left(b_{31}^2 + b_{32}^2 + b_{33}^2\right)^{-1} = 0. \qquad (6)$$

Signed and Sealed this
Fifth Day of December, 2023

*Katherine Kelly Vidal*
*Director of the United States Patent and Trademark Office*

CERTIFICATE OF CORRECTION (continued)
U.S. Pat. No. 11,738,252 B2

Column 8, Line 25:

$$(b_{11}b_{21}+b_{12}b_{22}+b_{13}b_{23})-(b_{31}^2 b_{32}^2+b_{33}^2)^{-1}(b_{11}b_{31}+b_{12}b_{32}+b_{13}b_{33})(b_{21}b_{31}+b_{22}b_{32}+b_{23}b_{33})=0. \quad (7)$$

Should read:

$$\left(b_{11}b_{21}+b_{12}b_{22}+b_{13}b_{23}\right)-\left(b_{31}^2+b_{32}^2+b_{33}^2\right)^{-1}\left(b_{11}b_{31}+b_{12}b_{32}+b_{13}b_{33}\right)\cdot \\ \cdot\left(b_{21}b_{31}+b_{22}b_{32}+b_{23}b_{33}\right)=0. \quad (7)$$

Column 8, Line 5:

$$\lambda^{-2}:=b_{31}^2+b_{32}^2+b_{33}^2 \quad (2)$$

Should read:

$$\lambda^{-2}:=b_{31}^2+b_{32}^2+b_{33}^2 \quad (2)$$

Column 8, Line 13:

$$c^2=(b_{11}^2+b_{12}^2+b_{13}^2)\lambda^2-x_p^2 \quad (4)$$

Should read:

$$c^2=\left(b_{11}^2+b_{12}^2+b_{13}^2\right)\lambda^2-x_p^2 \quad (4)$$

Column 8, Line 15:

$$c^2=(b_{21}^2+b_{22}^2+b_{23}^2)\lambda^2-y_p^2 \quad (5)$$

Should read:

$$c^2=\left(b_{21}^2+b_{22}^2+b_{23}^2\right)\lambda^2-y_p^2 \quad (5)$$

Column 8, Line 20:

$$(b_{11}^2+b_{12}^2+b_{13}^2)-(b_{21}^2+b_{22}^2+b_{23}^2)+[(b_{21}b_{31}+b_{22}b_{32}+b_{23}b_{33})^2-(b_{11}b_{31}+b_{12}b_{32}+b_{13}b_{33})^2](b_{31}^2+b_{32}^2+b_{33}^2)^{-1}=0. \quad (6)$$

Should read:

$$\left(b_{11}^2+b_{12}^2+b_{13}^2\right)-\left(b_{21}^2+b_{22}^2+b_{23}^2\right)+\left[\left(b_{21}b_{31}+b_{22}b_{32}+b_{23}b_{33}\right)^2- \\ -\left(b_{11}b_{31}+b_{12}b_{32}+b_{13}b_{33}\right)^2\right]\left(b_{31}^2+b_{32}^2+b_{33}^2\right)^{-1}=0. \quad (6)$$

Column 8, Line 25:

$$(b_{11}b_{21}+b_{12}b_{22}+b_{13}b_{23})-(b_{31}^2 b_{32}^2+b_{33}^2)^{-1}(b_{11}b_{31}+b_{12}b_{32}+b_{13}b_{33})(b_{21}b_{31}+b_{22}b_{32}+b_{23}b_{33})=0. \quad (7)$$

Should read:

$$\left(b_{11}b_{21}+b_{12}b_{22}+b_{13}b_{23}\right)-\left(b_{31}^2+b_{32}^2+b_{33}^2\right)^{-1}\left(b_{11}b_{31}+b_{12}b_{32}+b_{13}b_{33}\right)\cdot \\ \cdot\left(b_{21}b_{31}+b_{22}b_{32}+b_{23}b_{33}\right)=0. \quad (7)$$